United States Patent [19]

Kim et al.

[11] 4,039,512
[45] Aug. 2, 1977

[54] POLYMERS OF BENZENE PHOSPHORUS OXYDICHLORIDE, 4,4'-THIODIPHENOL AND POCl$_3$

[75] Inventors: Ki Soo Kim, Irvington; Siegfried Altscher, Monsey, both of N.Y.

[73] Assignee: Stauffer Chemical Company, Westport, Conn.

[21] Appl. No.: 613,145

[22] Filed: Sept. 15, 1975

[51] Int. Cl.$^2$ .................... C08G 33/10; C08G 33/18
[52] U.S. Cl. .................................. 260/61; 260/2 P; 260/DIG. 24
[58] Field of Search ............... 260/61, 2 P, DIG. 24, 260/45.7 PS

[56] References Cited

U.S. PATENT DOCUMENTS

| | | | |
|---|---|---|---|
| 2,572,076 | 10/1951 | Toy | 260/61 |
| 2,616,873 | 11/1952 | Cass | 260/61 |
| 2,716,101 | 8/1955 | Coover, Jr. | 260/61 |
| 3,719,727 | 3/1973 | Masai et al. | 260/860 |

*Primary Examiner*—Theodore E. Pertilla
*Attorney, Agent, or Firm*—Richard P. Fennelly

[57] ABSTRACT

Flame retardant polymers of benzene phosphorus oxydichloride, 4,4'-thiodiphenol and POCl$_3$ are disclosed which are preferably formed by reacting these monomers in an inert organic solvent at ambient temperature in the presence of an amine acid acceptor.

8 Claims, No Drawings

POLYMERS OF BENZENE PHOSPHORUS OXYDICHLORIDE, 4,4'-THIODIPHENOL AND POCl₃

TECHNICAL DESCRIPTION OF THE INVENTION

The present invention relates to polymers of resinous, branched polymeric phosphonates having improved flame retardant properties.

In U.S. Pat. No. 2,716,101 to H.M. Coover Jr. et al. it was proposed that resinous products be formed by reacting an organophosphonic acid dichloride, such as benzene phosphorus oxydichloride, a dihydroxy aromatic compound, such as a dihydroxydiphenyl sulfone, and a trifunctional phosphorus compound, such as phosphorus oxydichloride. The Coover Jr. et al. patent mentioned that the products produced by such a reaction were useful as materials for the preparation of fibers, films, coating and molding compositions and the like.

It has been unexpectedly found that flame retardant copolymers formed by reacting benzene to phosphorus oxydichloride, 4,4'-thiodiphenol and POCl₃ have a flame retardancy which is superior to that exhibited by similar copolymers containing a dihydroxydiphenyl sulfone, e.g., 4,4'-sulfonyl diphenol, as taught by Coover Jr. et al. The flame retardant copolymers of this invention also have utility as an engineering thermoplastic which is suitable for use in conventional injection molding apparatus.

The molar ratio of benzene phosphorus oxydichloride to POCl₃ which are reacted together with 4,4'-thiodiphenol to form the copolymers of the present invention can range anywhere from about 100:1 to about 1:100. It is preferred to use a ratio of from about 50:1 to about 1:50. The molar ratio of 4,4'-thiodiphenol to benzene phosphorus oxydichloride and POCl₃ should be from about 1:1.2 to about 1.8:1, preferably from about 1:1 to about 1.5:1. In general, it is most preferred to use benzene phosphorus oxydichloride, 4,4'-thiodiphenol and POCl₃ in such relative amounts that the molar amount of chlorine in the oxydichloride and POCl₃ is approximately equal to the molar mount of hydroxyl groups in the diphenol. The final product will contain moieties derived from these reactants in the same amounts described above.

A number of processes can be used to make the copolymers of the present invention. For example, any of the above described amounts of the three reactants can be reacted in the absence of either solvent or catalyst at elevated temperatures of from about 120° C. to about 250° C. until a homogeneous melt is produced. This reaction has the disadvantage that it is quite slow, taking several days to complete, and it yields a product which may be of a dark color containing undesired residual hydrochloric acid which can cause chain degradation in the product.

Another procedure which can be used is the same general reaction sequence which is described in U.S. Pat. No. 2,716,101 to H.W. Coover Jr. et al. In this procedure, the monomers, as described above, are reacted in the presence of a catalytically effective amount of a suitable anhydrous alkaline earth halide condensation catalyst, e.g., anhydrous magnesium chloride, at a temperature of from about 90° C. to about 300° C. If desired, this reaction can be carried out in a suitable inert solvent.

The procedure which is preferred for purposes of the present invention is the reaction of the above monomers in the above described amounts at much lower temperatures, e.g., from about 0° C. to about 80° C., in solution and in the presence of an amount of amine acid acceptor which is sufficient to scavenge the hydrochloric acid by-product which is produced by the reaction of the monomers. Generally, a molar amount of amine acid acceptor which ranges from about 2:1 to 3:1, based on the molar amount of the reacting benzene phosphorus oxydichloride or 4,4'-thiodiphenol monomers is sufficient. The solvent which is selected is preferably an inert organic solvent, most preferably a chlorinated hydrocarbon solvent, which will not interfere with the reaction and in which the intermediates and product are soluble. Suitable solvents include methylene chloride, chloroform, dichloroethane and the like.

The amine acid acceptor can be any of the $C_1$-$C_8$ trialkyl or branched dialkyl monoamines or the heterocyclic amines. Preferred acid acceptors are the $C_1$-$C_8$ trialkylamines. Some representative amines are triethylamine, pyridine, diisopropylamine, and the like.

The solubility of the copolymer of this invention in various organic solvents is affected by the amount of POCl₃ which is used. Use of low amounts of POCl₃ will yield a more soluble copolymer whereas higher amounts of POCl₃ will yield a more crosslinked, more insoluble copolymer. It is well within the ability of persons of ordinary skill in the art to vary the molar amount of POCl₃ which is reacted to yield the desired degree of solubility. The copolymers of the present invention can be used as materials for the production of nonflammable fibers, molding compositions and the like.

These and other embodiments of the claimed invention are illustrated by the Examples which follow:

EXAMPLE 1

This Example describes a procedure for forming a copolymer of benzene phosphorus oxydichloride, 4,4'-thiodiphenol and POCl₃ (hereinafter called "BPOD/TDP/POCl₃" copolymer) in accordance with the present invention.

A three necked flask with a mechanical stirrer, addition funnel and condenser were used. The following reagents were charged into the flask:

| Reagent | Amount |
|---|---|
| 4,4'-thiodiphenol | 89.8 g. (0.412 mole) |
| Triethylamine | 88.8 g. (0.88 mole) |
| Methylene chloride | 600 ml. |

The following reagents were placed in the addition funnel:

| Reagent | Amount |
|---|---|
| Benzene phosphorus oxydichloride | 78.0 g. (0.40 mole) |
| POCl₃ | 1.22 g. (0.008 mole) |
| Methylene chloride | 250 ml. |

The benzene phosphorus oxydichloride was slowly added to the flask over a period of 20–30 minutes with rapid stirring at room temperature. The stirring was continued for one hour after the addition had been completed, and the resulting solution was washed with an equal volume of 1N hydrochloric acid and an equal volume of distilled water. The solution was added to methanol to yield the desired product as a precipitate. The precipitate was removed from solution and was vacuum dried.

The relative viscosity of the product was 1.92 when measured as a 1% by weight solution in a 60/40 phenol/tetrachloroethane mixture. The yield of product was 90%. It had an intrinsic viscosity of 0.65 and a melting point of 180° C.

EXAMPLE 2

The same procedure used in Example 1 was again used to form a copolymer of benzene phosphorus oxydichloride, 4,4'-sulfonyldiphenol and $POCl_3$, as described in U.S. Pat. No. 2,716,101 to H.W. Coover Jr. et al. This polymer is hereinafter abbreviated "BPOD/SDP/$POCl_3$" copolymer. The reagents in the flask are:

| Reagent | Amount |
| --- | --- |
| 4,4'-sulfonyl diphenol | 65.38 g. (0.2575 mole) |
| Triethylamine | 55.5 g. (0.55 mole) |
| Methylene chloride | 400 ml. |

The reagents in the addition funnel are:

| Reagent | Amount |
| --- | --- |
| Benzene phosphorus oxydichloride | 48.75 g. (0.25 mole) |
| $POCl_3$ | 0.77 g. (0.005 mole) |
| Methylene chloride | 100 ml. |

The yield of product was 94%, it had an intrinsic viscosity of 0.42 and a melting point of 185°–190° C.

EXAMPLE 3

Examples 1 and 2 were repeated using a higher amount of $POCl_3$ so as to yield copolymers having a 2 mole % content of $POCl_3$ based on the molar sum of benzene phosphorus oxydichloride, the diphenol and $POCl_3$. The amount in Examples 1 and 2 was 1%.

The copolymer products in this Example were tested for flammability using the Limiting Oxygen Index (LOI) ASTM D-2863 test which is described by Fenimore and Martin in the November, 1966 issue of Modern Plastics. This method directly relates to the minimum percentage concentration of oxygen in an oxygen-nitrogen mixture which permits a sample to burn. A high LOI is indicative of a higher degree of flame retardancy. The following LOI values were observed and demonstrate the greater flame retardancy for the product of the present invention.

| Sample | LOI | MP(° C) | $T_g$(° C) |
| --- | --- | --- | --- |
| BPOD/TDP/$POCl_3$ copolymer | 60 | 180 | 88 |
| BPOD/SDP/$POCl_3$ copolymer | 50 | 190 | 151 |

The polymers of the present invention have an intrinsic viscosity of from about 0.30 to about 1.1 when measured in a 60/40 mixture (by weight) of phenol and tetrachloroethane at 30° C. A preferred intrinsic viscosity is greater than about 0.35 and less than about 0.7.

These Examples illustrate certain preferred embodiments of the claimed invention. The scope of protection which is sought is set forth in the claims which follow.

What is claimed is:

1. A resinous polymer of benzene phosphorus oxydichloride, 4,4'-thiodiphenol and $POCl_3$.

2. A polymer as claimed in claim 1 which has an intrinsic viscosity of from about 0.30 to about 1.1 when measured in a 60/40, weight ratio, phenol/tetrachloroethane mixture at 30° C.

3. A polymer as claimed in claim 1 which has an intrinsic viscosity of greater than about 0.35 and less than about 0.7 when measured in a 60/40, weight ratio, phenol/tetrachloroethane mixture at 30° C.

4. A polymer as claimed in claim 1 wherein the molar ratio of benzene phosphorus oxydichloride to $POCl_3$ ranges from about 100:1 to about 1:100.

5. A polymer as claimed in claim 4 wherein the molar ratio ranges from about 50:1 to about 1:50.

6. A polymer as claimed in claim 1 wherein the molar ratio of 4,4'-thiodiphenol to benzene phosphorus oxydichloride and $POCl_3$ ranges from about 1:1.2 to about 1.8:1.

7. A polymer as claimed in claim 6 wherein the ratio of 4,4'-thiodiphenol to benzene phosphorus oxydichloride and $POCl_3$ ranges from about 1:1 to about 1.5:1.

8. A polymer as claimed in claim 1 formed by a reaction such that the molar amount of chlorine in the oxydichloride and $POCl_3$ is about equal to the molar amount of hydroxyl groups in the diphenol.

* * * * *